(12) United States Patent
Kim et al.

(10) Patent No.: US 9,524,064 B2
(45) Date of Patent: Dec. 20, 2016

(54) DISPLAY DEVICE WITH INTEGRATED TOUCH SCREEN

(71) Applicant: LG Display Co., Ltd., Seoul (KR)

(72) Inventors: Tae Hwan Kim, Gyeonggi-do (KR); Yong Chan Park, Seoul (KR); Sang Soo Hwang, Seoul (KR)

(73) Assignee: LG Display Co., Ltd., Seoul (KR)

(*) Notice: Subject to any disclaimer, the term of this patent is extended or adjusted under 35 U.S.C. 154(b) by 15 days.

(21) Appl. No.: 14/060,814

(22) Filed: Oct. 23, 2013

(65) Prior Publication Data

US 2014/0118277 A1 May 1, 2014

(30) Foreign Application Priority Data

Oct. 29, 2012 (KR) .................. 10-2012-0120591

(51) Int. Cl.
G06F 3/041 (2006.01)
G06F 3/044 (2006.01)

(52) U.S. Cl.
CPC ..... *G06F 3/044* (2013.01); *G06F 2203/04103* (2013.01)

(58) Field of Classification Search
CPC .... G06F 3/0488; G06F 3/04883; G06F 3/044; G06F 3/04886; G06F 3/045
USPC .............................. 345/173, 174; 178/18.06
See application file for complete search history.

(56) References Cited

U.S. PATENT DOCUMENTS

| | | |
|---|---|---|
| 8,111,344 B2 | 2/2012 | Moon et al. |
| 8,310,648 B2 | 11/2012 | Moon et al. |
| 9,310,942 B2 | 4/2016 | Park |
| 2008/0239175 A1 | 10/2008 | Moon et al. |
| 2010/0193257 A1* | 8/2010 | Hotelling ............. G06F 3/0412 178/18.06 |

(Continued)

FOREIGN PATENT DOCUMENTS

| CN | 101276107 A | 10/2008 |
|---|---|---|
| CN | 102736811 A | 10/2012 |

OTHER PUBLICATIONS

Chinese Office Action dated Apr. 25, 2016 from the Chinese Patent Office in the counterpart Chinese patent application No. 201310504019.5.

*Primary Examiner* — Kent Chang
*Assistant Examiner* — Mark Edwards
(74) *Attorney, Agent, or Firm* — Morgan, Lewis & Bockius LLP (57) ABSTRACT

Disclosed is a display device with integrated touch screen. The display device includes a plurality of receiving electrodes formed in a block type and in parallel with a plurality of data lines, a driving electrode group configured to include a plurality of driving electrodes that are respectively disposed between the plurality of receiving electrodes, a plurality of receiving electrode lines respectively connected to the plurality of receiving electrodes, a plurality of driving electrode lines configured to extend from the respective driving electrodes to the first non-display area, a driving IC configured to apply a common voltage or a driving pulse to the plurality of receiving electrode lines and the plurality of driving electrode lines, and a plurality of driving dummy lines formed at a plurality of pixels, covered by a corresponding driving electrode, in a direction parallel to the plurality of driving electrode lines.

20 Claims, 8 Drawing Sheets

(56) References Cited

U.S. PATENT DOCUMENTS

| | | | |
|---|---|---|---|
| 2010/0194698 A1* | 8/2010 | Hotelling | G06F 1/3218 345/173 |
| 2010/0194707 A1* | 8/2010 | Hotelling | G06F 3/0412 345/173 |
| 2011/0273401 A1* | 11/2011 | Moriwaki | G02F 1/13338 345/174 |
| 2012/0164769 A1 | 6/2012 | Moon et al. | |
| 2012/0218199 A1* | 8/2012 | Kim | G06F 3/0412 345/173 |
| 2012/0256861 A1 | 10/2012 | Park | |

\* cited by examiner

FIG. 1

[ Related Art ]

FIG. 2

[ Related Art ]

DISPLAY DEVICE WITH INTEGRATED TOUCH SCREEN

CROSS-REFERENCE TO RELATED APPLICATIONS

This application claims the benefit of the Korean Patent Application No. 10-2012-0120591 filed on Oct. 29, 2012, which is hereby incorporated by reference as if fully set forth herein.

BACKGROUND

Field of the Invention

The present invention relates to a display device, and more particularly, to a display device with an integrated and built-in touch screen.

Discussion of the Related Art

With the advance of various portable electronic devices such as mobile terminals and notebook computers, the demand for flat panel display (FPD) devices applied to the portable electronic devices is increasing. In such FPD devices, the application fields of liquid crystal display (LCD) devices are being expanded due to advanced manufacturing technology, an easily driven driver, a high-quality image, and a large screen.

Instead of an input device such as a mouse or a keyboard which is conventionally applied to LCD devices, a touch screen that enables a user to directly input information with a finger or a pen is recently applied as an input device to LCD devices.

Particularly, in applying a touch screen to an LCD device that is used in portable terminals such as smartphones, LCD devices with an integrated touch screen built into a liquid crystal panel are being developed for slimming.

Figure 1:
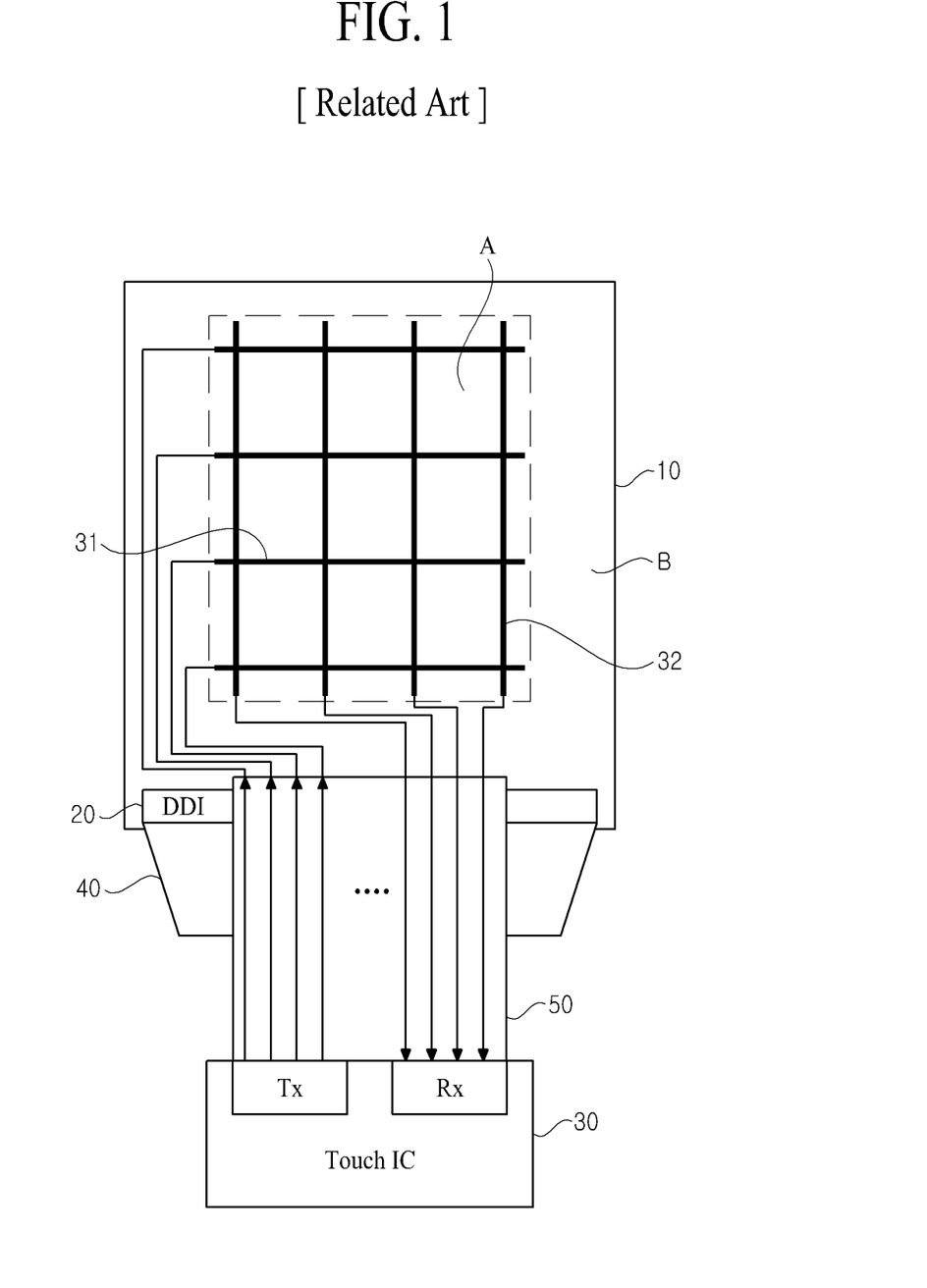
FIG. 1 is an exemplary diagram illustrating a configuration of a related art LCD device with integrated touch screen.

FIG. 1 is an exemplary diagram illustrating a configuration of a related art LCD device with integrated touch screen, and particularly illustrates a configuration of a portable terminal such as a smartphone or the like.

Among LCD devices with integrated touch screen of the related art, a LCD device with integrated touch screen applied to portable terminals, as illustrated in FIG. 1, includes a panel 10 with a built-in touch screen, a display driver integrated circuit (IC) (DDI) 20 that is connected to an external system, and controls a plurality of gate lines and a plurality of data lines formed in the panel 10, a touch screen driver IC (hereinafter simply referred to as a touch IC) 30 that drives the touch screen provided in the panel 10, a flexible printed circuit (FPC) 40 for DDI that connects the DDI and the external system, and an FPC 50 for touch IC that connects the touch screen and the touch IC 30.

The LCD device with integrated touch screen, as illustrated in FIG. 1, includes a plurality of driving electrodes 31 and a plurality of receiving electrodes 32, which configure the touch screen and are formed in a display area A, and a plurality of lines that are connected to the driving electrodes 31 and the receiving electrodes 32 and formed in a non-display area B. Due to this, a bezel width of the LCD device increases.

Since the touch IC 30 is connected to the touch screen of the panel 10 through the FPC 50 for touch IC, a manufacturing process is complicated.

Figure 2:
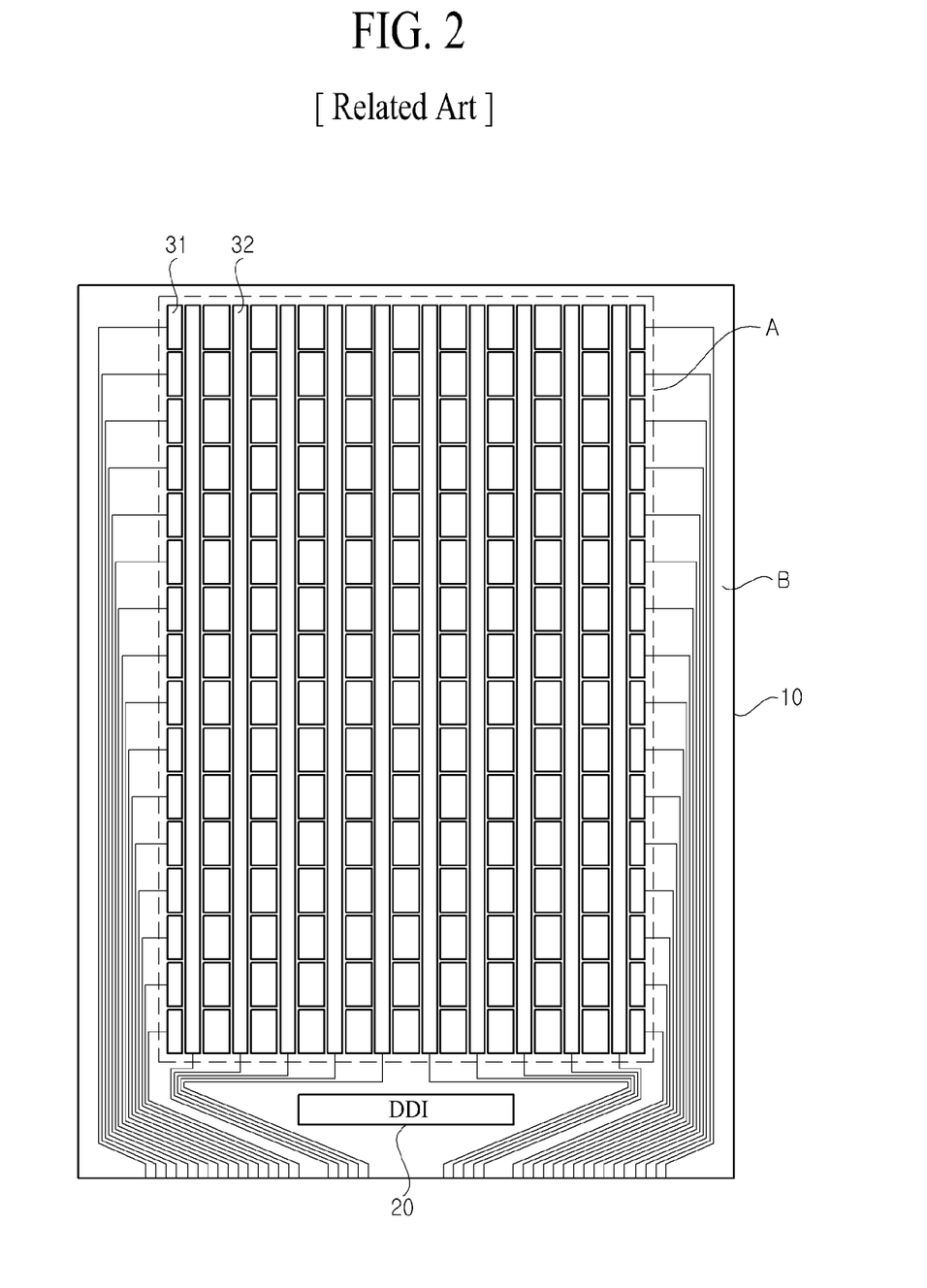
FIG. 2 is an exemplary diagram illustrating a detailed structure of a touch screen provided in a panel of a related art LCD device with integrated touch screen.

FIG. 2 is an exemplary diagram illustrating a detailed structure of a touch screen provided in a panel of a related art LCD device with integrated touch screen, and illustrates the panel 10 of FIG. 1 in detail.

In the related art LCD device with integrated touch screen, as illustrated in FIG. 2, the plurality of driving electrodes 31 for applying a driving pulse (a touch driving voltage) and the plurality of receiving electrodes 32 for respectively receiving a plurality of sensing signals are formed at a lower substrate.

The plurality of receiving electrodes (Rx) 32 are formed in parallel with the plurality of data lines (not shown) and across the panel 10. The plurality of driving electrodes (Tx) 31 are formed in parallel with the plurality of gate lines (not shown), but are separated from each other by a corresponding receiving electrode.

Adjacent driving electrodes 31, which are laterally separated from each other by a corresponding receiving electrodes 32, are electrically connected across the corresponding receiving electrode 32 by a driving electrode link line that is formed on a layer different from a layer with the receiving electrodes 32 formed thereon. That is, the driving electrodes next to both sides of a corresponding receiving electrode 32 are electrically connected by a driving electrode link line and a contact hole that are formed on a layer different from the layer with the receiving electrodes 32 formed thereon.

Therefore, the plurality of driving electrodes 31 are arranged in one row and in parallel with the plurality of gate lines at the panel 10, connected by a plurality of the driving electrode link lines, and receive the same driving pulse.

Each of the plurality of driving electrodes 31 is formed over several to tens of pixels, and each of the plurality of receiving electrodes 32 is formed over several to hundreds of pixels.

In the related art LCD device with integrated touch screen, as illustrated in FIG. 2, since the plurality of lines that connect the driving electrodes 31 or receiving electrodes 32 configuring the touch screen to the touch IC 30 are formed in the non-display area B of the panel 10, a left bezel width and right bezel width of the LCD device increase, and due to this, it is difficult to form a borderless or narrow bezel That is, in the related art LCD device with integrated touch screen, since the plurality of lines that connect the driving electrodes 31 or the receiving electrodes 32 to the touch IC 30 are formed in the left and right non-display areas B of the panel 10, the bezel width of the panel 10 increases.

SUMMARY

Accordingly, the present invention is directed to provide a display device with integrated touch screen that substantially obviates one or more problems due to limitations and disadvantages of the related art.

An aspect of the present invention is directed to provide a display device with integrated touch screen in which a plurality of driving electrode lines for connecting a plurality of driving electrodes configuring a touch screen to a driving IC are formed in only one of four non-display areas formed at an edge of a panel, and a plurality of driving dummy lines, which correspond to the plurality of driving electrode lines without being connected to the driving IC, are formed in a plurality of pixels in which a corresponding driving electrode is formed.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device with integrated touch screen including: a plurality of receiving electrodes formed in a block type and in parallel with a plurality of data lines, in a panel; a driving electrode group configured to include a plurality of driving electrodes that are respectively disposed between the plurality of receiving electrodes in one row and in parallel with a plurality of gate lines formed in the panel; a plurality of receiving electrode lines respectively connected to the plurality of receiving electrodes, and formed in a first non-display area of the panel; a plurality of driving electrode lines configured to extend from the respective driving electrodes to the first non-display area in parallel with the plurality of data lines; a driving IC configured to apply a common voltage or a driving pulse to the plurality of receiving electrode lines and the plurality of driving electrode lines; and a plurality of driving dummy lines formed at a plurality of pixels, covered by a corresponding driving electrode, in a direction parallel to the plurality of driving electrode lines, wherein the plurality of driving dummy lines are not connected to the plurality of driving electrode lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings. The present invention may be applied to LCD devices, but is not limited thereto. For another example, the present invention may be applied to various types of display devices that display an image by using a common electrode and a common voltage.

Figure 3:
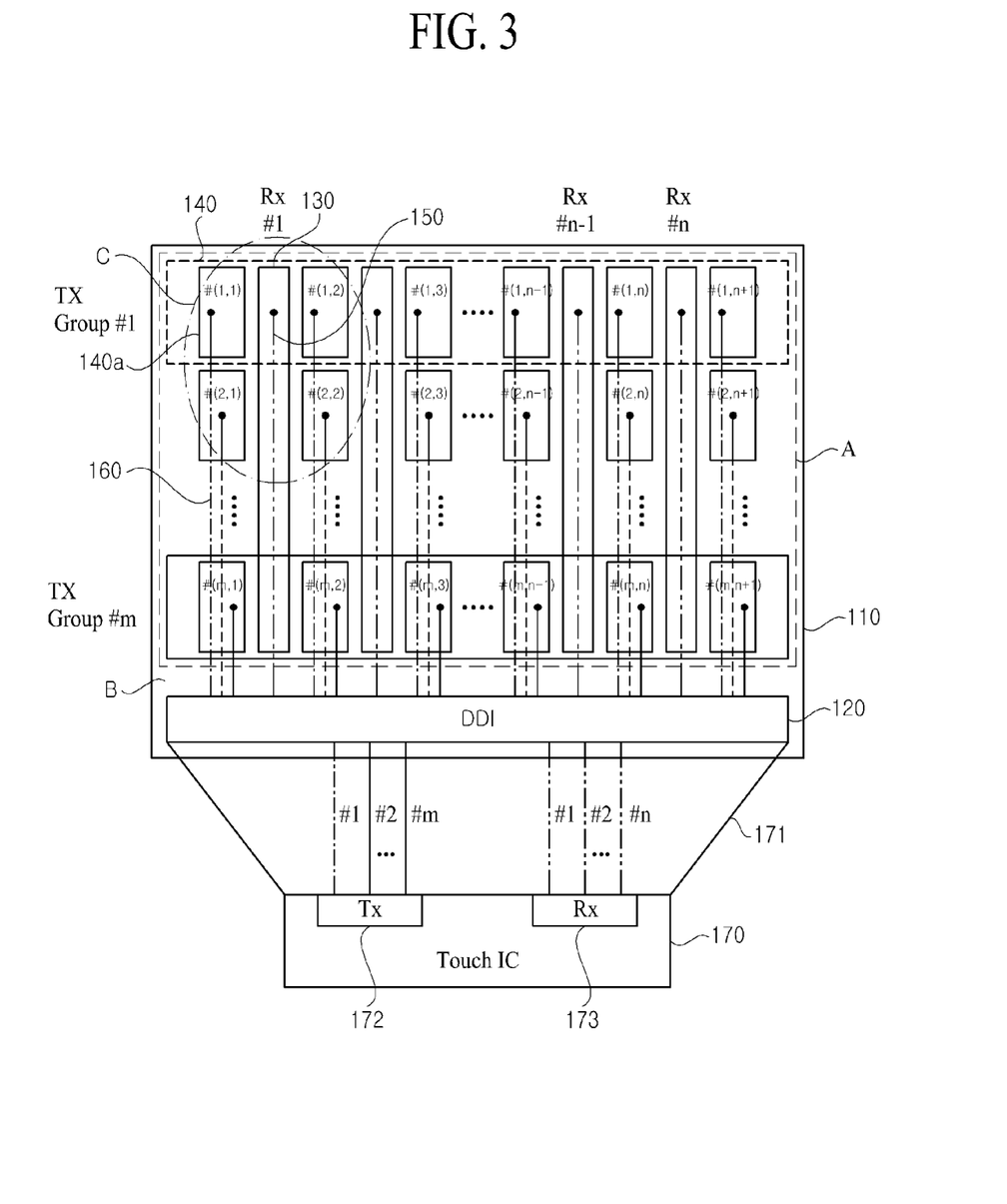
FIG. 3 is an exemplary diagram illustrating a configuration of a panel of a display device with integrated touch screen according to the present invention.

FIG. 3 is an exemplary diagram illustrating a configuration of a panel of a display device with integrated touch screen according to the present invention.

The present invention relates to a display device with an integrated and built-in mutual capacitive touch screen, and as illustrated in FIG. 3, the display device includes: a plurality of receiving electrodes 130 that are formed in a block type and in parallel with a plurality of vertically formed data lines (not shown) in a panel 110; a electrode group (Tx Group) 140 that is configured with a plurality of driving electrodes 140a which are respectively arranged between the plurality of receiving electrodes 130 in one row and in parallel with a plurality of gate lines (not shown) vertical to the plurality of data lines, in the panel 110; a plurality of receiving electrode lines 150 that are respectively connected to the plurality of receiving electrodes 130, and formed in a first non-display area B of the panel 110; a plurality of electrode lines 160 that extend from the respective driving electrodes 140a to the first non-display area B in parallel with the plurality of data lines; a plurality of driving ICs 120 and 170 that are disposed in a direction of the first non-display area B, and apply a common voltage or a driving pulse to the plurality of receiving electrode lines 150 and the plurality of driving electrode lines 160 connected to a plurality of the driving electrode groups 140; a plurality of driving dummy lines that are not connected to the driving ICs 120 and 170, and are respectively formed in a plurality of pixels covered by a corresponding driving electrode 140a in correspondence with the respective driving electrode lines 160; and a plurality of receiving dummy lines that are not connected to the driving ICs 120 and 170, and are respectively formed in a plurality of pixels covered by a corresponding receiving electrode 130 in correspondence with the respective receiving electrode lines 150. Here, the plurality of driving electrode groups 140 and the plurality of receiving electrodes 130 configure a touch screen.

Each of the plurality of receiving electrodes (a plurality of sensing electrodes) 130 configuring the touch screen, for example, as illustrated in FIG. 3, is formed as one block in a vertical (column) direction along a corresponding data line (not shown). One receiving electrode 130 covers tens to hundreds of pixels that are formed in a matrix type at the panel 10.

The plurality of driving electrodes 140a are arranged in a checkered type with one receiving electrode 130 between adjacent driving electrodes 140a. A plurality of the driving electrodes 140a, which are arranged in one row along a corresponding gate line at the panel 110, configure one driving electrode group. The same driving pulse is applied to the plurality of driving electrodes 140a configuring the one driving electrode group 140.

Each of the plurality of receiving electrode lines 150 is formed in the first non-display area B in which a display driver IC 120 configuring the driving ICs is disposed, and connects a corresponding receiving electrode 130 to the display driver IC 120 or a touch IC 170 configuring the driving ICs. The plurality of receiving electrode lines 150, as described above, may be connected to the display driver IC 120 or the touch IC 170, but hereinafter, for convenience of description, a display device in which the plurality of receiving electrodes 150 are connected to the display driver IC (DDI) 120 will be described as an example of the present invention. In this case, the plurality of driving electrode lines 160 connected to the plurality of driving electrodes 140a are connected to the display driver IC 120.

The plurality of receiving electrode lines 150 respectively connected to first receiving electrodes (Rx #1) 130 to an nth receiving electrodes (Rx #n) 130, as illustrated in FIG. 3, are connected to the display driver IC 120. In FIG. 3, the plurality receiving electrode lines 150 are illustrated as being connected to respective upper ends of the receiving electrodes 130. However, each of the plurality of receiving electrode lines 150 may be connected to a corresponding receiving electrode 130 at a distal end of the corresponding receiving electrode 130, namely, at a portion adjacent to the first non-display area B.

The plurality of driving electrode lines 160 extend from the respective driving electrodes 140a to the first non-display area B in a direction parallel to the data lines or the receiving electrodes 130, and are connected to the display driver IC 120. The plurality of driving electrodes 140a, which are disposed on one horizontal (row) line and configures one driving electrode group 140, may be electrically connected.

In order to electrically connect the plurality of driving electrodes 140a, as illustrated in FIG. 3A, the driving electrode lines 160 respectively connected to the driving electrodes 140a configuring one driving electrode group 140 are arranged in parallel with the data lines or the receiving electrodes 130. The driving electrode lines 160 are connected to each other in the first non-display area B or the display driver IC 120.

To provide an additional description, in order for a plurality of driving electrodes 140a configuring one driving electrode group 140 to be connected to each other, the driving electrode lines 160 connected to the respective driving electrodes 140a extend in a direction parallel to the data lines or the receiving electrodes 130, and formed in the first non-display area B of a lower portion of the panel 110. The driving electrode lines 160 formed in the first non-display area B may be connected to one line in the first non-display area B, and the one line may be inserted into the display driver IC 120. Alternatively, the driving electrode lines 160 formed in the first non-display area B may be connected to the display driver IC 120, and connected to one line in the display driver IC 120.

A method that applies the same signal to a plurality of driving electrodes 140a configuring one driving electrode group 140 and a circuit design of the driving electrode lines 160 for the method will be described in detail with reference to FIG. 9.

The driving IC applies the common voltage or the driving pulse to the receiving electrode lines 150 and the driving electrode lines 160 connected to the plurality of driving electrode groups 140, and includes: the display driver IC 120 that is provided in the first non-display area B, and applies the common voltage or the driving pulse to the driving electrodes 140 and the receiving electrodes 130; and the touch IC 170 that determines whether there is a touch in the panel 110, by using a plurality of sensing signals which are received from the receiving electrodes 130 according to the driving pulse.

The driving electrode groups 140 and the receiving electrodes 130 receive the common voltage in an image output period, and receive the driving pulse to output a plurality of sensing signals in a touch sensing period. An input/output of the common voltage, driving pulse, and sensing signals is controlled by the display driver IC 120 and the touch IC 170.

A configuration and disposition of the display driver IC 120 and the touch IC 170 may be various changed. However, as described above, a display device in which the driving electrode lines 160 and the receiving electrode lines 150 are connected to the touch IC 170 through the display driver IC 120 will be described as an example of the present invention. In this case, a detailed example of the display driver IC 120 will be described in detail with reference to FIG. 9.

Except that the driving dummy lines and the receiving dummy lines are not connected to the display driver IC 120, the driving dummy lines and the receiving dummy lines are formed in the same structure as the driving electrode lines 160 and the receiving electrode lines 150 at the panel 110.

A driving electrode line 160 are connected to a plurality of pixels which are formed in one row and in parallel with the data lines among a plurality of pixels covered by a driving electrode 140a, and extends to the first non-display area B through the other driving electrode lines 160.

When it is assumed that each of the driving electrodes 140a corresponds to several to tens of pixels in a direction parallel to the gate lines and corresponds to several to tens of pixels in a direction parallel to the data lines, each of the driving electrode lines 160 may be connected to some of a plurality of pixels covered by a corresponding driving electrode 140a.

Likewise, among a plurality of pixels covered by the receiving electrode 130, a plurality of pixels in which the receiving electrode line 150 is formed may be some of the plurality of pixels covered by the receiving electrode 130.

That is, the driving electrode lines 160 and the receiving electrode lines 150 may be formed at only some of the plurality of pixels configuring the panel 110.

The driving electrode line 160, the receiving electrode line 150, and the data line are formed in a portion, covered by a black matrix, of a display area A. However, in a process of manufacturing the display device, the driving electrode line 160 and the receiving electrode line 150 cannot accurately be aligned with the black matrix, in which case light is blocked by the driving electrode line 160 and the receiving electrode line 150.

The driving electrode lines 160 and the receiving electrode lines 150 are formed at only some of the plurality of pixels configuring the panel 110 as described above, and the driving electrode lines 160 and the receiving electrode lines 150 cannot accurately be aligned with a plurality of the black matrixes, light is blocked in only an area in which the driving electrode lines 160 and the receiving electrode lines 150 are formed.

In this case, a defect occurs in which a light transmittance of the panel 110 is not uniform.

Therefore, the driving dummy line which is not connected to the display driver IC 120 is formed at a plurality of pixels, through which the driving electrode line 160 does not pass, among a plurality of pixels covered by the driving electrode 140a. Also, the receiving dummy line which is not connected to the display driver IC 120 is formed at a plurality of pixels, through which the receiving electrode line 150 does not pass, among a plurality of pixels covered by the receiving electrode 130.

A structure of each of the driving electrode line 160, receiving electrode line 150, driving dummy line, and receiving dummy line will be described in detail with reference to FIGS. 4 to 8.

Figure 4:
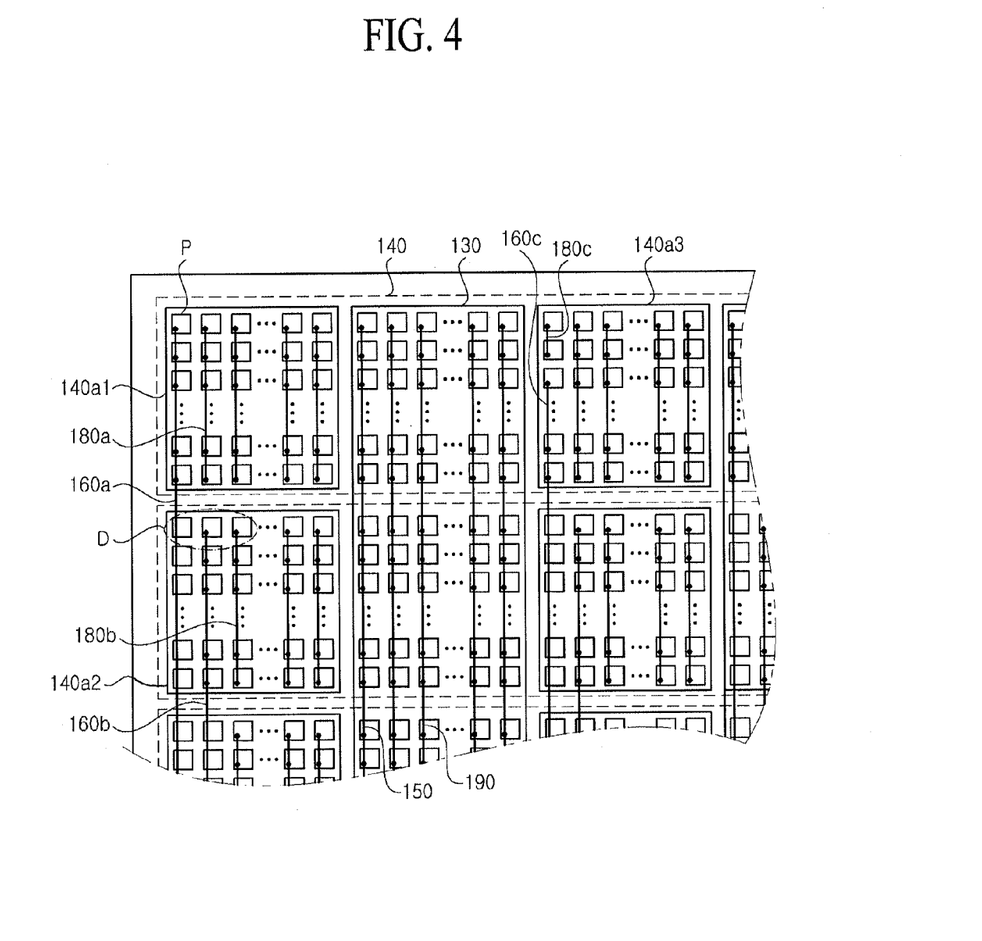
FIG. 4 is an enlarged exemplary diagram of a plane of the display device with integrated touch screen according to the present invention.
Figure 5:
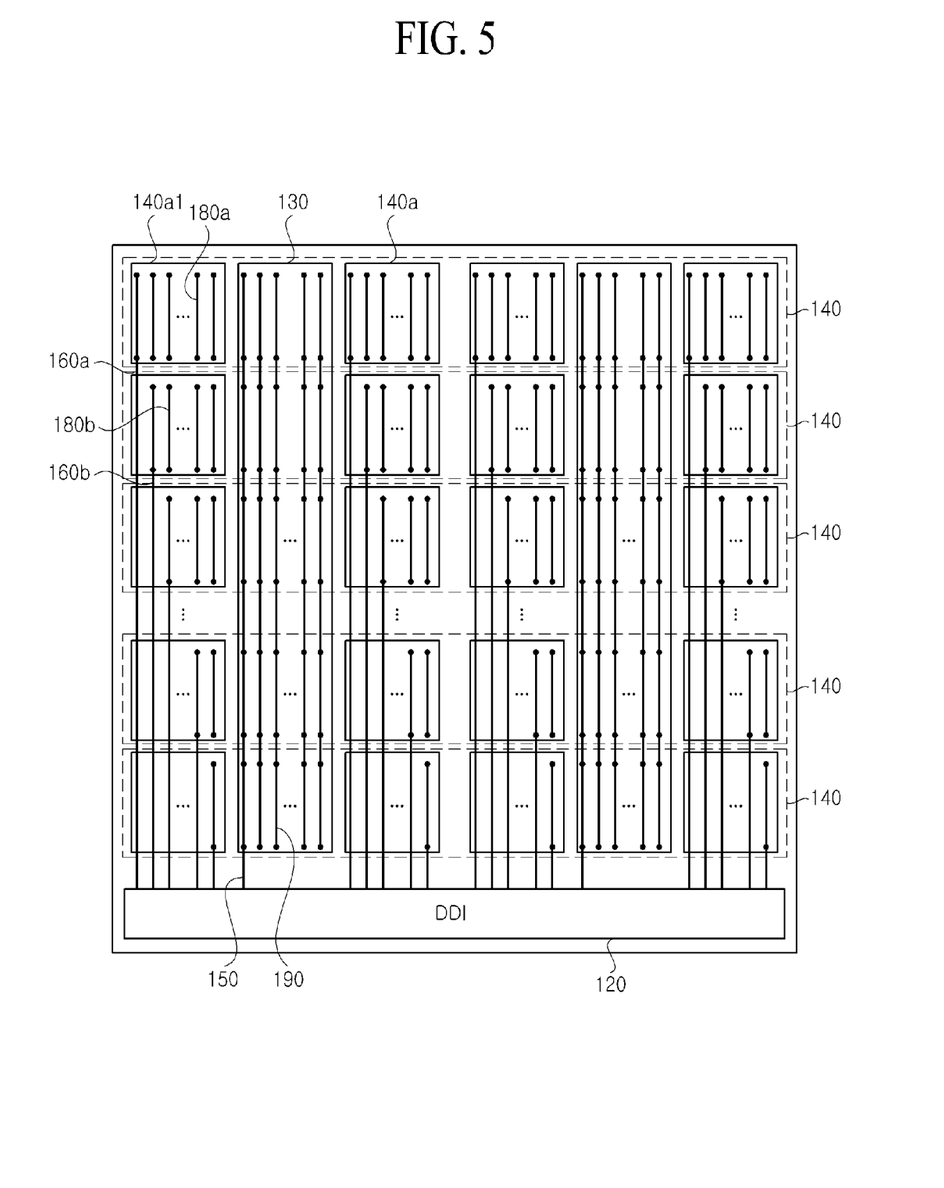
FIG. 5 is an exemplary diagram illustrating a plurality of driving electrode lines, a plurality of receiving electrode lines, a plurality of driving dummy lines, and a plurality of receiving dummy lines formed in the display device with integrated touch screen according to the present invention.

FIG. 4 is an enlarged exemplary diagram of a plane of the display device with integrated touch screen according to the present invention, and is an enlarged diagram of a portion C of FIG. 3. FIG. 5 is an exemplary diagram illustrating a plurality of driving electrode lines, a plurality of receiving electrode lines, a plurality of driving dummy lines, and a plurality of receiving dummy lines formed in the display device with integrated touch screen according to the present invention;

In the display device with integrated touch screen according to the present invention, as described above, the driving electrode lines 160 connected to the respective driving electrodes 140a extend to the first non-display area B in parallel with the data lines, and are connected to the display driver IC 120. The receiving electrode lines 150 connected to the respective receiving electrodes 130 extend to the first non-display area B in parallel with the data lines, and are connected to the display driver IC 120. The driving dummy line 180 is formed in parallel with the driving electrode line 160, at all pixels covered by one driving electrode 140a. The receiving dummy line 190 is formed in parallel with the receiving electrode line 150, at all pixels covered by one receiving electrode 130.

Hereinafter, for convenience of description, a driving electrode formed at a left upper portion of FIG. 4 is referred to as a first driving electrode 140a1, and a driving electrode formed under the first driving electrode 140a1 is referred to as a second driving electrode 140a2. Also, a dot "●" illustrated in each pixel of FIGS. 4 and 5 denotes that the driving electrode line 160, the receiving electrode line 150, the driving dummy line 180, and the receiving dummy line 190 are electrically connected to the driving electrode 140a formed at a corresponding pixel.

A driving electrode line 160a connected to the first driving electrode 140a1, for example, may be formed at a plurality of pixels P, which are formed at the leftmost portion, among a plurality of pixels (hereinafter simply referred to as first driving electrode pixels) covered by the first driving electrode 140a1.

In this case, as illustrated in FIG. 4, the first driving electrode line 160a may be connected to all pixels (hereinafter simply referred to as first row pixels) which are formed at the leftmost side of the first driving electrode 140a1 in a direction parallel to the data lines, but only one of the first row pixels may be connected thereto.

When the first driving electrode line 160a is connected to only some of the first row pixels, among the first row pixels, pixels which are not connected to the first driving electrode line 160a may be connected to a third driving dummy line 180c. In this state, a third driving electrode 140a3 is illustrated as being formed at the rightmost side of FIG. 4. That is, the third driving electrode line 160c may be connected to pixels other than two pixels (which are formed at an upper portion) among a plurality of first row pixels corresponding to the third driving electrode 140a3, in which case the two pixels formed at the upper portion among the plurality of first row pixels may be connected by only the third driving dummy line 180c without being connected to the third driving electrode line 160c.

When the first driving electrode line 160a is formed over all of the first row pixels as illustrated in FIG. 4, the first driving electrode line 160a may not wholly be connected electrically to the first driving electrode 140a1 formed at the first row pixels.

That is, when the first driving electrode line 160a is formed over all of the first row pixels as illustrated in FIG. 4, the first driving electrode line 160a may be electrically connected to only the first driving electrode 140a1 formed in at least one of the first row pixels. To provide an additional description, the dot "●" which is used for showing the first driving electrode line 160a being electrically connected to the driving electrode 140a formed at the at least one pixel may be formed at only at least one of the first row pixels.

Figure 8:
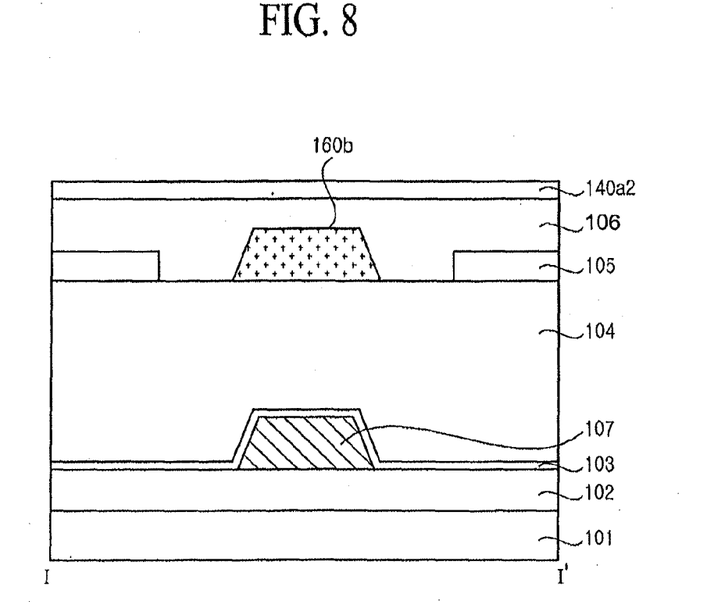
FIG. 8 is an exemplary diagram illustrating a cross-sectional surface taken along direction I-I' of FIG. 6 in the display device with integrated touch screen according to the present invention.

The first driving electrode line 160a is not electrically connected to the first row pixels formed at the second driving electrode 140a2. That is, the first driving electrode line 160a is insulated from the second driving electrode 140a2. Also, as illustrated in FIG. 8, the first driving electrode line 160a extends to the first non-display area B without being electrically connected to the other driving electrodes 140a.

A plurality of driving dummy lines 180a and 180, as illustrated in FIGS. 4 and 5, are formed in parallel with the first driving electrode line 160a at pixels, through which the first driving electrode line 160a does not pass, among the first driving electrode pixels. Each of the driving dummy lines 180a formed at the first driving electrode pixels is simply referred to as a first driving dummy line.

That is, the first driving dummy lines 180a are formed over pixels, which are formed in a direction parallel to the first driving electrode line 160a, among the first driving electrode pixels.

Therefore, in FIG. 4, when the first driving electrode 140a1 covers sixty pixels in a width direction and covers forty pixels in a length direction, a total of 59 first driving dummy lines 180 are formed.

The first driving electrode 140a1 formed at pixels through which the first driving dummy line 180a passes, as illustrated in FIG. 4, may be electrically connected or may not be connected to the first driving dummy line 180a, and may be connected to only at least one first driving dummy line 180a. Also, the first driving dummy lines 180a do not extend toward the driving electrodes 140a and the receiving electrode 130, instead of the first driving dummy lines 180a.

A second driving electrode line 160b is formed in the same pattern as the first driving electrode line 160a. In this case, as illustrated in FIG. 4, the second driving electrode line 160b is formed over a plurality of second row pixels among a plurality of second driving electrode pixels so as not to overlap the first driving electrode line 160a.

That is, the first driving electrode line 160a and the second driving electrode line 160b may be formed at various positions so as not to overlap each other.

In this case, the number of pixels arranged in a width direction of the driving electrode 140a is more than the number of driving electrode groups 140, and thus, the driving electrode lines 160 respectively connected to the driving electrodes 140a do not overlap each other.

The second driving dummy lines 180b formed at the second driving electrode 140a2 may be formed in the same method as the first driving dummy line 180a.

The receiving dummy line 190, as illustrated in FIGS. 4 and 5, is formed at a plurality of receiving electrode pixels covered by the receiving electrode 130 in the same type as the first and second driving dummy lines 180a and 180b.

A plurality of receiving dummy lines one less than the number of pixels formed in the width direction of the receiving electrode 130 are formed at a plurality of receiving electrode pixels covered by one receiving electrode 130. A receiving electrode line 150 for connecting the receiving electrode 130 and the display driver IC 120 is formed on the other one pixel row.

Similarly to the driving electrode line 160, the receiving electrode line 150 may be electrically connected to the receiving electrode 130 formed at one of a plurality of pixels through which the receiving electrode line 150 passes.

Moreover, the receiving dummy line 190 may be electrically connected to the receiving electrode 130 formed at one of a plurality of pixels through which the receiving dummy line 190 passes.

That is, in FIGS. 4 and 5, all pixels through which the driving dummy line 180 passes are illustrated as being connected to the driving dummy line 180, and all pixels through which the receiving dummy line 190 passes are illustrated as being connected to the receiving dummy line 190. However, only at least one pixel may be connected to the driving dummy line 180 or the receiving dummy line 190.

The driving electrode line 160, the receiving electrode line 150, the driving dummy line 180, and the receiving dummy line 190 are formed at pixels covered by the other driving electrodes 140a and receiving electrodes 130 which are not described above.

Figure 6:
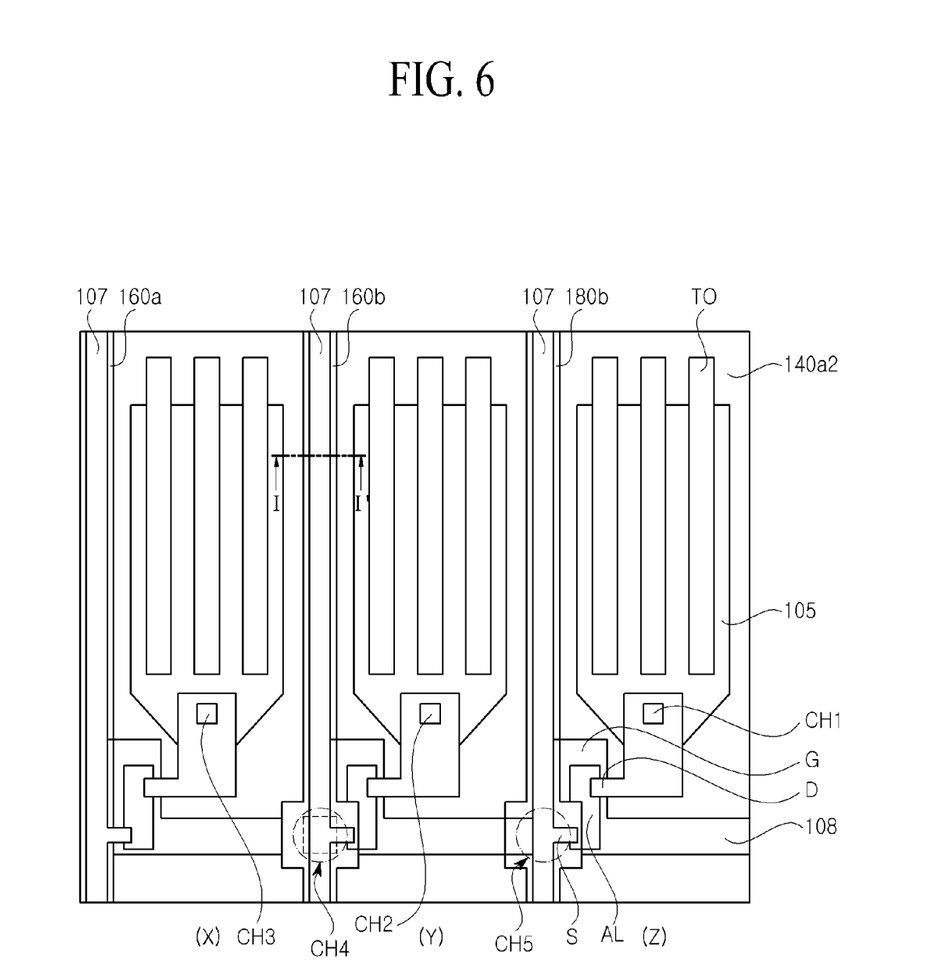
FIG. 6 is an exemplary diagram illustrating three pixels of the display device with integrated touch screen according to the present invention.
Figure 7:
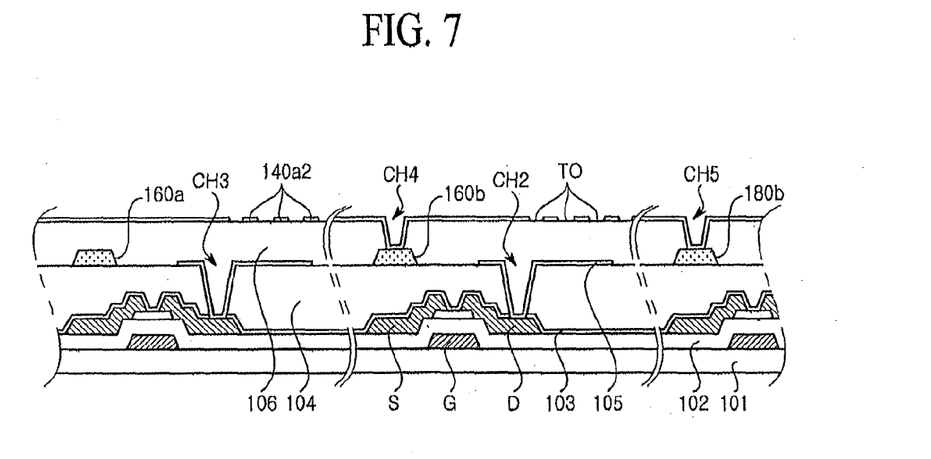
FIG. 7 is an exemplary diagram schematically illustrating a cross-sectional surface of the display device with integrated touch screen according to the present invention.

FIG. 6 is an exemplary diagram illustrating three pixels of the display device with integrated touch screen according to the present invention, and is an enlarged diagram of a portion D of FIG. 4. FIG. 7 is an exemplary diagram schematically illustrating a cross-sectional surface of the display device with integrated touch screen according to the present invention, and illustrates a connection state between a source electrode and a pixel electrode, a connection state between a driving electrode line and a driving electrode, and a connection state between a driving dummy line and the driving electrode, in the three pixels of FIG. 6. FIG. 8 is an exemplary diagram illustrating a cross-sectional surface taken along direction I-I' of FIG. 6 in the display device with integrated touch screen according to the present invention.

Referring to FIGS. 6 and 7, in the display device with integrated touch screen according to the present invention, a plurality of pixel electrodes 105 are respectively formed at a plurality of areas defined by a plurality of gate lines 108 and a plurality of data lines 107 which are arranged to intersect the plurality of gate lines 108. A thin film transistor (TFT) includes a gate electrode G extending from a corresponding gate line 108, a source electrode S extending from a corresponding data line 107, a drain electrode D connected to a corresponding pixel electrode 105 through a contact hole CH1, and an active layer AL disposed therebetween. Also, the driving electrode 140a used as a common electrode includes a plurality of slits TO that are long formed at certain intervals.

As described above, when the plurality of slits TO are formed at the common electrode, a fringe field is generated between the pixel electrode 105 and the common electrode (the driving electrode) 140a through the plurality of slits TO, and thus, liquid crystal may be driven in a fringe field switching (FFS) mode. The present invention may be applied to LCD devices with a built-in capacitive touch screen, and the driving electrode 140a is used as the common electrode of the LCD devices. However, as described above, the present invention may be applied to display devices having various types and structures.

A cross-sectional surface corresponding to a plane of FIG. 6 is as illustrated in FIG. 7. In FIG. 7, a lower substrate of the panel 110 includes the gate electrode G, the active layer AL, the source electrode S, the drain electrode D, the pixel electrode 105, the second driving electrode line 160b, the second driving electrode 140a2, the first driving electrode line 160a, and the second driving dummy line 180b which are stacked on a lower base substrate 101, and also includes a gate insulating layer 102, a buffer PAS 103, a PAC 104, and a PAC 106. Also, the second driving electrode 140a2 used as the common electrode includes a plurality of slits TO that are long formed at certain intervals.

Here, the drain electrode D is connected to the pixel electrode 105 through a plurality of contact holes CH1 to CH3 which are formed at the buffer PAS 103 and the PAC 104. Also, the second driving electrode line 160b may be connected to the second driving electrode 140a2 through a contact hole CH4, and formed on the same layer as the pixel electrode 105.

However, the plane structure of FIG. 6 and the cross-sectional structure of FIG. 7 may be changed to various types.

The first driving electrode line 160a for connecting the first driving electrode 140a1 to the display driver IC 120, as illustrated in FIG. 6, is disposed in parallel with the data line 107 of a first pixel X (which is formed on a first row) among the plurality of second driving electrode pixels, but as illustrated in FIG. 7, the first driving electrode line 160a is not connected to the second driving electrode 140a2.

The second driving electrode line 160b for connecting the second driving electrode 140a2 to the display driver IC 120, as illustrated in FIG. 6, is disposed in parallel with the data line 107 of a second pixel Y (which is formed on a second row) among the plurality of second driving electrode pixels, and as illustrated in FIG. 7, the second driving electrode line 160b is connected to the second driving electrode 140a2 through the contact hole CH4.

The second driving dummy line 180b formed at a third pixel Z covered by the second driving electrode 140a2, as illustrated in FIG. 6, is disposed in parallel with the data line 107 of the third pixel Z (which is formed on a third row) among the plurality of second driving electrode pixels, and as illustrated in FIG. 7, the second driving dummy line 180b is connected to the second driving electrode 140a2 through a contact hole CH5.

FIG. 8 is for describing a connection relationship between the driving electrode line 160 and driving electrode 140 of the display device with integrated touch screen according to the present invention, and is an exemplary diagram illustrating a cross-sectional surface taken along direction I-I' of FIG. 6.

That is, FIG. 8 is a diagram for describing that the data line and the second driving electrode line 160b are disposed at the panel 110 to overlap each other with an insulating layer therebetween.

For example, as illustrated in FIG. 8, the second driving electrode 140a2 used as the common electrode may be formed at a surface of the lower substrate, and the second driving electrode 160b may be formed in parallel with the data line 107 with the buffer PAS 103 and PAC 104 (which are insulating materials) therebetween. Here, the second driving electrode 160b may be formed of a material different from the data line 107 or the second driving electrode 140a2.

When the second driving electrode line 160b connected to the second driving electrode 140a2 is passing by a lower end of the other driving electrode, as illustrated in FIG. 8, the second driving electrode line 160b is insulated from the other driving electrode by an insulating material such as the PAS 106, and thus does not contact the other driving electrode.

The second driving electrode line 160b, as illustrated in FIG. 7, may be connected to the second driving electrode 140a2 through the contact hole CH4 formed at the PAS 106.

When the first driving electrode line 160a and the second driving dummy line 180b are cut in a direction corresponding to the direction I-I', the first driving electrode line 160a and the second driving dummy line 180b have the same type as that of FIG. 8. That is, as illustrated in FIG. 8, the first driving electrode line 160a, the second driving electrode line 160b, and the second driving dummy line 180b are disposed to overlap each other with an insulating material therebetween, and may be connected to the second driving electrode 140a2 in the same type as that of FIG. 7.

Figure 9:
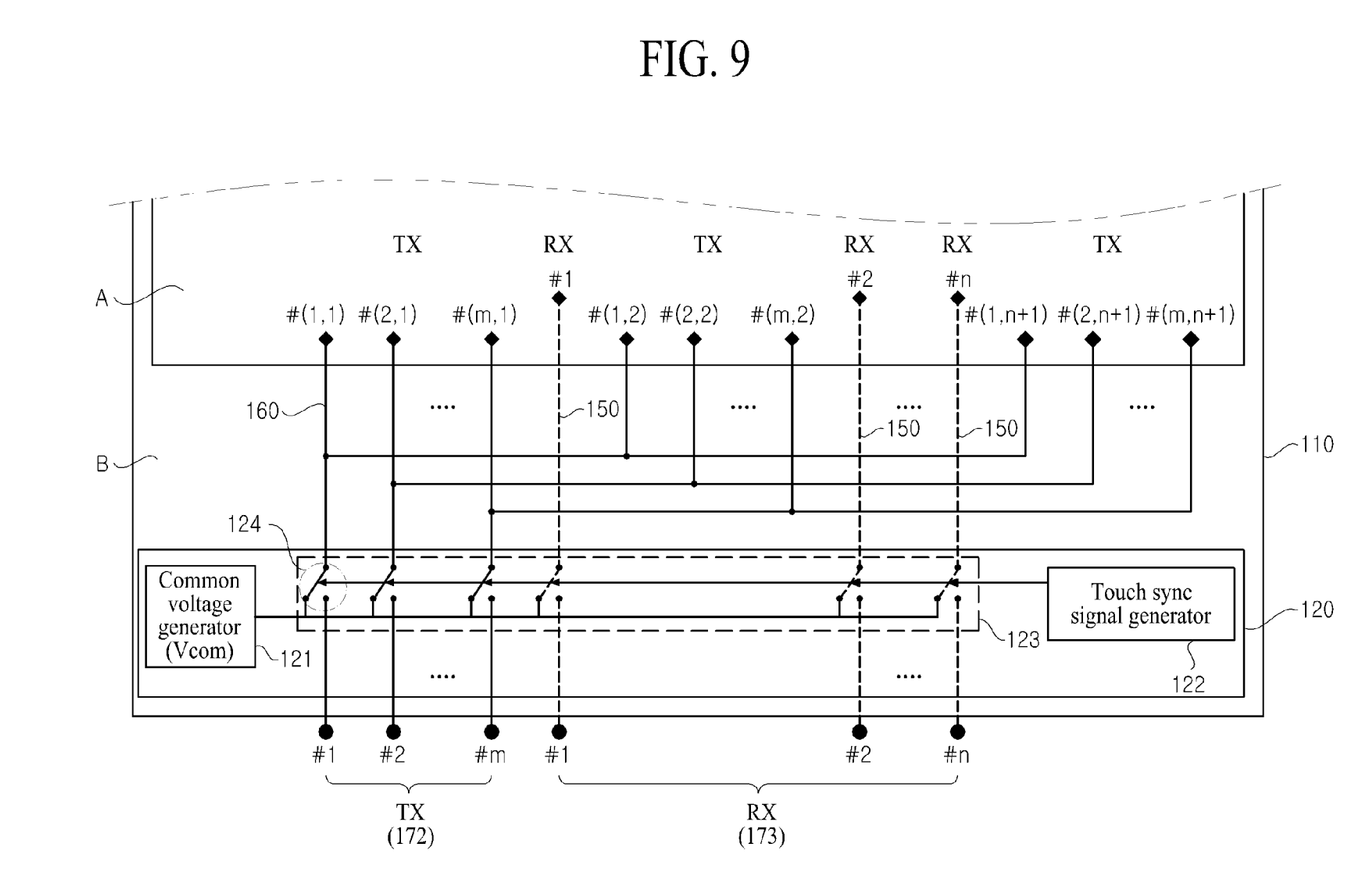
FIG. 9 is an exemplary diagram illustrating a detailed configuration of a display driver IC applied to the display device with integrated touch screen according to the present invention.

FIG. 9 is an exemplary diagram illustrating a detailed configuration of a display driver IC applied to the display device with integrated touch screen according to the present invention.

As described above with reference to FIGS. 4 to 8, the driving electrode line 160 and the receiving electrode line 150 for connecting the driving electrode 140a to the display driver IC 120 or the touch IC 170 are formed at the plurality of pixels configuring the display device with integrated touch screen according to the present invention. Also, the driving dummy line 180 and the receiving dummy line 190 are formed at pixels in which the driving electrode line 160 and the receiving electrode line 150 are not formed.

A method, which applies the common voltage to the panel 110 in the image output period and applies the driving pulse to the panel 110 in the touch sensing period, may be variously implemented depending on a disposition type of the display driver IC 120 and the touch IC 170, an internal structure of the display driver IC 120, and an internal structure of the touch IC 170. The display driver IC 120, which will now be described with reference to FIG. 9, is an example for executing the above-described function.

The display device with integrated touch screen according to the present invention, as described above, may includes the plurality of receiving electrodes 130, the plurality of driving electrode groups 140, the display driver IC 120, the plurality of receiving electrode lines 150, the plurality of driving electrode lines 160, the plurality of driving dummy lines 180, the plurality of receiving dummy lines 190, and the touch IC 170.

Here, the plurality of receiving electrodes 130, the plurality of driving electrode groups 140, the plurality of receiving electrode lines 150, the plurality of driving electrode lines 160, the plurality of driving dummy lines 180, and the plurality of receiving dummy lines 190 have been described above with reference to FIGS. 3 to 8, and thus, only the display driver IC 120 and the touch IC 170 will now be described.

The touch IC 170, as illustrated in FIG. 3, includes a driver 173, which applies a driving voltage to the plurality of driving electrode groups 140, and a receiver 173 that receives a sensing signal from each of the plurality of receiving electrodes 130.

The touch IC 170 may be connected to the display driver IC 120 through an FPC 171, or provided in the display driver IC 120.

That is, the touch IC 170 may be connected to the driving electrode groups 140 and the receiving electrodes 130, which are formed at the panel 110, through the display driver IC 120.

The display driver IC 120, as described above, drives the date lines and the gate lines which are formed at the panel 110, drives the driving electrodes and the receiving electrodes, and drives the common electrode used as the driving electrode. The display driver IC 120, as illustrated in FIG. 9, may include a common voltage generator 121, a touch sync signal generator 122, and a switching unit 123. In addition, the display driver IC 120 may further include a gate driver that applies a scan signal to the gate lines, a data driver that applies image data signals to the respective data lines, and a controller that controls the elements. A detailed description on such elements is not provided.

The common voltage generator 121 generates the common voltage that is applied to the common electrode operating as the driving electrode 140 or the receiving electrode 130. That is, the present invention is characterized in that the common electrode acts as the driving electrode 140 or the receiving electrode 130, and the display driver IC 120 applies the common voltage generated by the common voltage generator 121 to the common electrode (the driving electrode or the receiving electrode) in the image output period, and applies a touch driving voltage (the driving pulse), transferred from the touch IC 170, to the driving electrodes 140a configuring each of the driving electrode groups 140 in the touch sensing period.

The touch sync signal generator 122 generates a control signal for connecting the driving electrode and the receiving electrode to the common voltage generator 121 or the touch IC 170 according to the image output period and the touch sensing period. That is, the touch sync signal generator 122 controls the switching unit 123 according to a first control signal in order for the common electrode (the driving electrode or the receiving electrode) to be connected to the common voltage generator 121 in the image output period, in which case the common voltage is applied to the common electrode. The touch sync signal generator 122 controls the switching unit 123 according to a second control signal in order for the common electrode (the driving electrode or the receiving electrode) to be connected to the touch IC 170 in the touch sensing period. The touch sync signal generator 122 may generate and output the above-described control signals according to control by the controller of the display driver IC. Also, the touch sync signal generator 122 may control the switching unit 123 by using the control signals, and moreover transfer the control signals to the touch IC 170 to control an operation of the touch IC 170.

The switching unit 123 connects the driving electrode groups 140 and the receiving electrodes 130, acting as the common electrode, to the common voltage generator 121 or the touch IC 170. To this end, the switching unit 123 is configured with a plurality of switches 170. That is, the switching unit 123 connects the receiving electrodes 130 and the driving electrodes 140a configuring each of the driving electrode groups 140 to the common voltage generator 121 in the image output period, and connects the receiving electrodes 130 and the driving electrodes 140a configuring each of the driving electrode groups 140 to the touch IC 170 in the touch sensing period to thereby allow the touch IC 170 to determine whether there is a touch.

According to the embodiments of the present invention, the plurality of driving electrode lines for connecting the plurality of driving electrodes configuring the touch screen to the driving IC are formed in only one of the four non-display areas formed at the edge of the panel, and the plurality of driving dummy lines, which correspond to the plurality of driving electrode lines without being connected to the driving IC, are formed in a plurality of pixels in which a corresponding driving electrode is formed. Accordingly, the light transmitting areas of the panel are formed in the same pattern on the panel, and thus, a quality of an image displayed by the panel can be improved.

That is, since the plurality of driving dummy lines having the same shape as the driving electrode lines are formed in the display device according to the present invention, an image quality can be improved compared to a case in which only the driving electrode lines are formed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with integrated touch screen, the display device comprising:
    a plurality of receiving electrodes formed in a block type and in parallel with a plurality of data lines, in a panel having four sides;
    a driving electrode group including a plurality of driving electrodes that are respectively disposed between the plurality of receiving electrodes in one row and in parallel with a plurality of gate lines formed in the panel;
    a plurality of receiving electrode lines respectively connected at one end to the plurality of receiving electrodes, and extending to a first non-display area at only one of the four sides of the panel;
    a plurality of driving electrode lines extending from the respective driving electrodes to the first non-display area at the only one of the four sides of the panel in parallel with the plurality of data lines;
    a driving IC configured to apply a common voltage or a driving pulse to the plurality of receiving electrode lines and the plurality of driving electrode lines;
    a plurality of driving dummy lines formed respectively at a plurality of pixels, respectively covered by a corresponding driving electrode, wherein the plurality of driving dummy lines are parallel to the plurality of driving electrode lines; and
    a plurality of receiving dummy lines provided respectively at a plurality of pixels, respectively covered by a corresponding receiving electrode, wherein the receiving dummy lines are parallel to the receiving electrode lines,
    wherein each of the driving dummy lines is connected to the corresponding driving electrode at one or more of the pixels covered by the corresponding driving electrode.

2. The display device of claim 1, further comprising another driving electrode group adjacent to the driving electrode group in the panel,
    wherein the two adjacent driving electrode groups are electrically insulated from each other in the panel.

3. The display device of claim 1, wherein each of the plurality of driving dummy lines is insulated from and overlaps a corresponding one of the data lines configured to apply a data voltage to one or more of the pixels at which the driving dummy line is formed.

4. The display device of claim 1, wherein:
    each of the plurality of receiving dummy lines is insulated from and overlaps a corresponding one of data lines configured to apply a data voltage to one or more pixels at which the receiving dummy line is formed, and
    each of the plurality of receiving dummy lines is electrically connected to a corresponding receiving electrode through at least one of a plurality of pixels through which the plurality of receiving dummy lines pass.

5. The display device of claim 1, wherein the driving IC comprises:
    a display driver IC disposed in the first non-display area, and configured to apply the common voltage or the driving pulse to the plurality of driving electrodes and the plurality of receiving electrodes; and
    a touch IC configured to determine whether there is a touch in the panel, by using a plurality of sensing signals that are respectively received from the plurality of receiving electrodes according to the driving pulse.

6. The display device of claim 1, wherein the plurality of driving electrode lines, connected to the plurality of driving electrodes configuring the driving electrode group, are connected to each other in the first non-display area or in the driving IC.

7. The display device of claim 1, wherein the driving dummy lines are each covered by no more than one corresponding driving electrode, and the receiving dummy lines are each covered by no more than one corresponding receiving electrode.

8. A display panel with integrated touch screen, the display panel comprising:
    a panel having a plurality of pixels in a display area of the panel;
    a plurality of receiving electrodes provided in a block type and in parallel with a plurality of data lines, in the panel having four sides;
    a plurality of driving electrode groups, each group including a plurality of driving electrodes that are respectively disposed between the plurality of receiving electrodes in one row and in parallel with a plurality of gate lines in the panel;
    a plurality of electrode lines provided in parallel with the plurality of data lines, each electrode line connected to one of the plurality of receiving electrodes and driving electrodes; and
    a plurality of dummy lines provided in parallel with the electrode lines and each passing through a corresponding one or more of the pixels,
    wherein the plurality of electrode lines are connected to a driving IC in a non-display area at only one of the sides of the panel,
    the plurality of dummy lines are provided in the display area of the panel,
    the plurality of dummy lines are parallel to the plurality of electrode lines,
    one of the dummy lines is covered by no more than one of the driving electrodes and receiving electrodes, and
    the plurality of dummy lines comprises a plurality of driving dummy lines, each driving dummy line being covered by and electrically connected to a corresponding one of the driving electrodes at the corresponding one or more of the pixels through which the driving dummy line passes.

9. The display panel of claim 8, wherein adjacent driving electrode groups are electrically insulated from each other in the panel.

10. The display panel of claim 8, wherein the plurality of electrode lines comprises:
   a plurality of driving electrode lines respectively connected to the driving electrodes; and
   a plurality of receiving electrode lines respectively connected to the receiving electrodes.

11. The display panel of claim 8, wherein the plurality of dummy lines further comprises:
   a plurality of receiving dummy lines, each receiving dummy line being covered by and electrically connected to a corresponding one of the plurality of receiving electrodes at one or more pixels through which the receiving dummy line passes.

12. The display panel of claim 8, wherein each of the plurality of driving dummy lines is insulated from and overlaps a corresponding one of the data lines configured to apply a data voltage to the corresponding one or more of the pixels through which the driving dummy line passes.

13. The display panel of claim 11, wherein each of the plurality of receiving dummy lines is insulated from and overlaps a corresponding one of the data lines configured to apply a data voltage to the one or more of the pixels through which the receiving dummy line passes.

14. The display panel of claim 8, wherein the dummy lines are provided only in the display area of the panel without extending into the non-display area.

15. The display device of claim 1, wherein the driving dummy lines and the receiving dummy lines are provided only in the display area of the panel without extending into the non-display area.

16. The display device of claim 1, further comprising a first insulating layer between the data lines and the driving electrode lines,
   wherein each of the driving electrode lines is insulated from a corresponding one of the data lines by the first insulating layer and overlaps the corresponding data line.

17. The display device of claim 16, further comprising a second insulating layer between the driving electrode lines and the driving electrodes,
   wherein each of the driving electrode lines is disposed between the first insulating layer and the second insulating layer and overlaps with one of the driving electrodes.

18. The display panel of claim 8, further comprising a first insulating layer between the data lines and the driving electrode lines,
   wherein each of the driving electrode lines is insulated from a corresponding one of the data lines by the first insulating layer and overlaps the corresponding data line.

19. The display device of claim 18, further comprising a second insulating layer between the driving electrode lines and the driving electrodes,
   wherein each of the driving electrode lines is disposed between the first insulating layer and the second insulating layer and overlaps with one of the driving electrodes.

20. The display panel of claim 10, wherein each of the driving electrode lines is connected to the corresponding driving electrode at one or more of the pixels different from the pixels through which the driving dummy lines pass.

* * * * *